Patented Sept. 25, 1951

2,569,092

UNITED STATES PATENT OFFICE 2,569,092

PHOSPHORIC ACID OR METAL PHOSPHATE CATALYSTS ON PRECALCINED CARRIERS AND THEIR PREPARATION

Roland F. Deering, Long Beach, Calif., assignor to Union Oil Company of California, Los Angeles, Calif., a corporation of California No Drawing. Application July 1, 1949, Serial No. 102,723

16 Claims. (Cl. 252—435)

This invention relates to a catalyst which finds use principally in the hydration and polymerization of unsaturated hydrocarbons. More particularly the invention pertains to a new and novel manner of preparing catalysts for these processes which results in a catalyst possessing physical qualifications superior to the catalysts heretofore employed in such processes. This is a continuation-in-part of application Serial No. 591,238, filed April 30, 1945, now U. S. Patent No. 2,496,621.

Phosphoric acid or metal salts of phosphoric acid have found widespread usage in catalysts for the polymerization and hydration of olefins and other reactions such as dehydration of alcohols to olefins and the like. The essential ingredient of the solid catalysts employed in these reactions is phosphoric acid which in a majority of cases constitutes 80% or more of the catalyst mixture. Of the various forms of phosphoric acid, orthophosphoric acid ($H_3PO_4$) is preferred for catalysts to be employed in the hydration of olefins and the pyrophosphoric acid ($H_4P_2O_7$) in polymerization reactions. The tetraphosphoric acid has also been employed in both of these processes, but as a general rule it is desired to prevent formation on the catalyst of the meta form of the acid ($HPO_3$). The particular form of phosphoric acid resulting in the finished catalyst is a function of the temperature at which the finished catalyst is dried. The progressive dehydration of one or more molecules of orthophosphoric acid will result in the formation of pyrophosphoric acid and subsequently the pyrophosphoric acid may be dehydrated to the tetraphosphoric acid which in turn may be dehydrated to the metaphosphoric acid. For this reason the temperature at which the catalyst preparations, according to this invention, are dried is held within fairly definite limits in order to insure the presence of the desired form of the acid on the catalyst.

The conventional method of preparing a phosphoric acid catalyst comprises mixing the liquid acid such as orthophosphoric acid with a powdered adsorbent material thereby forming a thick paste which is subsequently dried. The catalyst may be formed by extrusion of the paste before drying by crushing and grading the dried mass, by pilling the powdered dried mass or the like. In this type of preparation the physical strength of the catalyst is dependent to a large extent upon the phosphoric acid in the mixture. Adsorbent materials normally employed in the preparation of these catalysts comprise predominately siliceous matter such as diatomaceous earth, kieselguhr, artificially prepared silica gel and the like. A catalyst prepared in this manner is dried at a temperature controlled so as to give in the final composition the particular form of phosphoric acid desired.

Some catalysts possess in the absence of water vapor sufficient physical strength to withstand continued usage. However, due to the hygroscopic nature of phosphoric acid and due further to the dependence of the catalyst structure on the phosphoric acid, physical degradation of the catalyst occurs when in contact with water vapor. This disadvantage is particularly evidenced in the case of hydration catalysts due to the presence in the feed to the hydration reaction of considerable quantities of steam. Whereas this destruction of physical structure is particularly noticeable in the hydration of olefins, it may also occur in the polymerization of olefins when excessive amounts of water vapor are present in the feed.

Generally it is the object of the present invention to provide a new and novel method of preparing solid catalysts comprising phosphoric acid, metal phosphates or a combination of the metal phosphates and a phosphoric acid with an adsorbent supporting material.

It is another object of the invention to improve the art of hydration, polymerization, dehydration and the like by preparing catalysts for these processes which exhibit superior mechanical strength to those heretofore employed.

More specifically it is the object of my invention to provide a method for preparing phosphoric acid containing solid catalysts which possess higher mechanical strength and particularly higher resistance to loss of mechanical strength in the presence of moisture than the solid phosphoric acid catalysts heretofore employed.

Other objects and advantages of my invention will become apparent to those skilled in the art as the description thereof proceeds.

Generally the catalyst preparation method according to my invention comprises precalcining an adsorbent siliceous material such as diatomaceous earth, kieselguhr, artificially prepared silica gels and the like to very high temperatures, for example, in the range of about 800° C. to about 1400° C. to impart thereto a high degree of mechanical strength independent of other constituents in the catalyst. The calcination may range from 1 to 20 hours or more in length but I have found that best results are obtained in the range of about 3 to about 10 hours. This precalcined support is subsequently impregnated with phosphoric acid, conveniently orthophosphoric acid by soaking the support in a solution of the acid having a concentration of 10 to 100% ($H_3PO_4$), or the acid may even contain free phosphorus pentoxide ($P_2O_5$). This impregnation is preferably carried out at room temperature although temperatures as high as 100° C. or higher may be employed.

The impregnated catalyst is subsequently dried at a temperature chosen on the basis of the desired form of the acid in the final composition. For the preparation of the polymerization catalyst by the above manner, the drying temperature will lie in the range of approximately 240° C. to 300° C. in which temperature range the orthophosphoric acid is converted to the pyrophosphoric acid without danger of subsequent conversion of the pyrophosphoric acid to the metaphosphoric acid. In the preparation of a hydration catalyst the drying temperature will be maintained below about 240° C. such as from about 105° C. to about 240° C. so as to prevent a conversion of the orthophosphoric acid to pyrophosphoric acid. Although the pyro form of acid is the preferred form for polymerization reactions and the ortho form is preferred for hydration reactions, it is to be understood that any or all of the various forms of phosphoric acids may be employed in the catalyst preparation and may occur in the final composition without departing from the essential elements of my invention. The catalysts may be dried at the desired temperatures for a period of from about 1 to about 20 hours or longer, but I have found that the optimum time of drying is between about 4 and about 8 hours.

A catalyst prepared in the above described manner, by imparting to the supporting material a physical structure independent of phosphoric acid, not only possesses a high initial mechanical strength but contrary to the presently employed solid phosphoric acid catalysts exhibits no softening or other mechanical breakdown when exposed to as high as 60% water vapor in the hydrocarbon feed.

It is preferable to use phosphoric acid itself for the impregnation of these siliceous supports, but the salts of this acid may also be used provided an excess of the acid is present. If salts are employed in this manner, those of the metals of the first, second and third "transitional" groups are preferred. These transitional groups include those elements having electronic structures such that the differentiating electron is in the second from the outermost shell; that is, the outermost shell remains substantially unchanged with two electrons, while the second from the outermost shell is being built up from eight to eighteen electrons. The metals of the first transitional group are those having atomic numbers between 21 and 30 and include scandium, titanium, vanadium, chromium, manganese, iron, cobalt, nickel, copper and zinc. Those of the second transitional group have atomic numbers between 39 and 48 and include yttrium, zirconium, columbium, molybdenum, masurium, ruthenium, rhodium, palladium, silver and cadmium. Those of the third transitional group have atomic numbers 57 and 72 to 80 and include lanthanum, hafnium, tantalum, tungsten, radium, osmium, iridium, platinum, gold and mercury. In impregnating the supports with phosphoric acid and the above metallic salts, the support may be immersed first in an aqueous solution of orthophosphoric acid; then the material thus impregnated is further impregnated with an aqueous solution of a soluble salt such as the chloride or nitrate of the desired metal or metals. The impregnations may also be carried out in the reverse order. The solid material may be dried between the impregnations if desired, and additional impregnations may also be employed to obtain the desired amounts of salts and acid. Such intermediate drying may also be carried out at temperatures from about 105° C. to about 300° C. for periods of from 1 to 20 hours or longer.

The above catalysts are suitable for the hydration of any olefin but are particularly suitable for the hydration of the normally gaseous olefins such as ethylene, propylene and the butenes. These may be employed in mixtures such as are found in gases producing in cracking operations, for example, or other mixtures. Suitable operating conditions for the hydration of the above olefins lie within temperature ranges of about 150° C. to about 350° C., preferably about 175° C. to 300° C.; pressures between about 1 and 200 atmospheres, preferably above 10 atmospheres; and contact times between about 1 second and 10 minutes. Steam must be employed, and the proportion of steam to olefin should be between about 15% and about 75%. The general effects of these reaction conditions are as follows: The lower temperatures, the higher pressures, and the higher steam ratios increase the degree of hydration; the higher temperatures reduce the contact time required; and the higher proportions of steam increase the total condensate obtainable from the product gas while decreasing the concentration of alcohol in the condensate. The conditions of temperature, pressure and concentration are so adjusted as to insure the maintenance of the vapor phase reaction. It is possible to conduct the operation in the liquid phase also but it is preferable to employ the vapor phase. When propylene is hydrated, the temperature conditions are preferably somewhat lower than for ethylene, a maximum of about 250° C. being preferable. Slightly lower maximum temperatures are preferred for the higher olefins.

As an example of the hydration of propylene, a diatomaceous earth-phosphoric acid catalyst prepared as in the above example (using about 80% orthophosphoric acid solution for the impregnation) and having an acidity corresponding to about 40% orthophosphoric acid, was employed in an operation similar to the above hydration operation at a temperature of about 180° C. and a pressure of about 250 pounds per square inch gage. The hydrocarbon feed stock consisted of about 90 to 95% propylene and 5 to 10% propane, and the gaseous stream passed over the catalyst consisted of about 82% of this hydrocarbon feed and 18% steam. The isopropyl alcohol recovered by condensing the condensibles in the product and separating the water by distillation, amounted to 4.0% of the propylene in the feed, which represents about 90% of the equilibrium value. The operation was continued for about 100 hours without appreciable loss in activity of the catalyst.

In further experimental work catalysts were prepared and tested to show the effect of the precalcination of the present invention on the activity and other characteristics of the catalyst. In one pair of tests, catalyst A was prepared by calcining a diatomaceous earth support at a temperature between 800° C. and 1400° C. for more than an hour before impregnating aqueous orthophosphoric acid on it. Catalyst B was also prepared from diatomaceous earth, but without the precalcination. Both catalysts were dried following the impregnation at temperatures of about 200° C. for 15 hours. These catalysts were tested by placing them in a reactor and passing over them a mixture of equal volumes of ethylene and water vapor at a temperature of about 525° F. (274° C.), a pressure of about 515 pounds per square inch gage and a space velocity between 50 and 100 volumes per volume of catalyst per hour over a four-hour reaction period. The average conversion to ethyl alcohol, expressed as per cent of the theoretical conversion under these conditions was 70% for the uncalcined catalyst B and 78% for the calcined catalyst A. It may also be noted that under the same conditions, employing similar catalysts having the conventional supports such as pumice and active charcoal, no observable conversion whatever is obtained.

As to characteristics other than activity, it was observed that the precalcined catalyst A above had a much superior mechanical strength than catalyst B, and retained its form and activity during use, whereas catalyst B tended to disintegrate and lose its effectiveness in use. Further, even when the precalcined catalyst A eventually lost its activity by loss of phosphoric acid, the carrier was still unharmed, and by re-impregnation with phosphoric acid was restored to substantially its full original activity. The disintegration of the uncalcined catalyst B prevented such re-use.

Similarly, catalysts containing the transitional element metals listed above may be prepared employing the precalcined silica carriers of this invention, and these also show improved activity and strength. For example the above catalyst A may be soaked in an aqueous solution of zinc chloride and dried at a temperature of about 220° C. to form a catalyst containing about 10% of zinc phosphate together with an excess of phosphoric acid, and this catalyst has a slightly greater activity than the above catalyst A, and equal strength and stability.

By employing a silica gel support calcined at 1000° C. for six hours and impregnated with about 50% of phosphoric acid and 5% of silver phosphate (by successive impregnation with orthophosphoric acid solution and silver nitrate solution) a catalyst is obtained which will give better than 80% of the theoretical conversion of butylenes to butyl alcohols when reacting a refinery four carbon atom hydrocarbon fraction with somewhat less than an equal volume of water vapor at a temperature of about 200° C. and a pressure of about 500 pounds gage. Similarly, solutions of mercuric chloride, cadmium chloride, nickel nitrate, manganese chloride, cobalt acetate or other soluble salts of the above transitional element metals and volatile acids, may be impregnated on carriers of diatomaceous earth, kieselguhr, silica gel or similar silica supports which have been calcined at temperatures greater than 800° C. for periods greater than about an hour. These salt impregnations may be made before or after impregnation with orthophosphoric acid solution, and sufficiently concentrated solutions or a sufficient number of impregnations may be made to give a product which when dried at a temperature not greater than 300° C., will contain a minor proportion, preferably between about 1% and about 20% of the metal phosphate, together with additional phosphoric acid, preferably between about 5% and up to at least 60%. These catalysts are more active than the corresponding catalysts prepared without precalcination of the silica supports, and are remarkably resistant to softening or mechanical breakdown when exposed to large amounts of water vapor as in the hydration reactions described above.

Although the invention has been described with particular reference to hydration of olefins these catalysts are also very active for other reactions. For example, acetylenes may be hydrated to obtain ketones, aldehydes, and unsaturated alcohols. In this reaction acetylenes having 2 to about 4 carbon atoms are preferred but the higher acetylenes may also be hydrated. The temperatures required are somewhat higher than those required for the olefin hydration given above, a maximum of about 400° C. being permissible. Very high proportions of water vapor are also desirable, to maintain the catalyst in the ortho or preferably in the pyro form without allowing it to dehydrate substantially to the meta form which appears to be inactive. When the pyro form is desired to predominate, the catalyst drying temperatures may also be higher, up to about 300° C., and more acid may be absorbed, up to acidities corresponding to 80 to 90% orthophosphoric acid being permissible.

The above catalysts are also active polymerization catalysts and for this purpose also are preferably employed substantially in the pyro form rather than the ortho form. The temperature conditions for polymerization are preferably between about 240° C. and about 300° C. although somewhat higher temperatures up to about 400° C. may also be employed. The temperature should not be so high, however, as to dehydrate the catalyst substantially to the meta form. Water vapor may also be employed in the reaction to prevent such dehydration of the catalyst but the amount of water vapor should not be so high as to cause hydration of the olefins to dominate the polymerization reaction. Ratios of water vapor to olefin between about 2% and 10% are suitable. It is in this type of polymerization reaction that the catalyst preparation method according to the present invention is particularly advantageous inasmuch as the presence of this 2% to 10% water vapor in the feed has no destructive effect on the physical characteristics of the catalyst because of the independence of the physical structure on the phosphoric acid in the catalyst. Pressure conditions for polymerization may be in approximately the same range or slightly lower range than for the hydration reaction such as about 1 atmosphere to about 150 atmospheres and preferably above about 10 atmospheres.

For example a catalyst of this invention may be prepared by calcining diatomaceous earth at a temperature of about 1200° C. for about three hours, and impregnating the product with an aqueous solution containing about 40% orthophosphoric acid. This product is dried at a temperature of about 290° C. for about two hours and is found to have an acidity corresponding to about 50% orthophosphoric acid. This product is placed in a reactor and a mixture of about 90% of a refinery butane-butene fraction (containing about 50% butenes) and about 10% water vapor is passed over the catalyst at a temperature of about 350° F. and a pressure slightly above atmospheric, and a conversion of about 80% of the butylenes to products boiling in the gasoline range is obtained. A similar catalyst prepared without precalcination gives a yield of only about 70%, and is much more subject to loss of strength and deterioration in use.

Similarly, the catalysts containing the transitional metal phosphates as well as phosphoric acid, prepared as described above, are also very active polymerization catalysts, and the precalcination increases their activity as well as their physical strength and resistance to decrease in activity and loss of strength during use. In using these catalysts for polymerization, it is preferable to dry them at temperatures between 240° C. and 300° C., to convert the acid to the pyrophosphoric form, but drying at somewhat lower temperatures may also be used. Also it is preferable to use in the polymerization reaction the amounts of water vapor indicated above, but smaller amounts of water may be used, particularly for short periods of time.

The above catalysts are also active for dehydration reactions such as the dehydration of alcohols to olefins, in which case conditions similar to those described for polymerization are suitable. Other reactions of analogous nature are also promoted by these catalysts, such as condensation of phenols with aldehydes, alcohols and aromatics, alkylation of olefins with aromatics and isoparaffins, isomerization of paraffins to isoparaffins, esterification, halogenation, and like reactions.

Variations in the process of recovery of reaction products such as the use of azeotropic distillation, solvent extraction and the like, recycling of the unreacted gas, use of moving bed or fluid catalyst contacting systems, and other variations which would occur to one skilled in the art, are to be included in the scope of the invention as defined in the following claims.

I claim:

1. A method of making a catalyst of the type comprising a siliceous support and a catalytic agent selected from the class of compounds consisting of the oxygen containing phosphoric acids and transitional element metal salts of phosphoric acids which comprises the steps of pre-calcining the siliceous support to a temperature between about 800° C. and about 1400° C. for a time sufficient to impart physical strength thereto independent of the other constituents of the catalyst, impregnating said calcined support with said catalytic agent and drying the impregnated support.

2. A method according to claim 1 in which the pre-calcined support is first impregnated with an aqueous solution of orthophosphoric acid, dried, and then impregnated with an aqueous solution of a salt of a transitional metal.

3. A method of making a catalyst according to claim 1 in which the impregnated support is dried at a temperature in the range of about 105° C. to about 300° C.

4. A method of making a catalyst of the type comprising a siliceous support upon which is distended a phosphoric acid which comprises a step of precalcining the siliceous support to a temperature between about 800° C. and about 1400° C. for a time sufficient to impart physical strength thereto independent of phosphoric acid in the final catalyst, impregnating said calcined support with said phosphoric acid, and drying the impregnated support.

5. A method according to claim 4 in which the acid is orthophosphoric acid.

6. A method for making a catalyst according to claim 4 in which the siliceous support is calcined prior to impregnation thereof for a time between about 1 hour and 20 hours and the phosphoric acid impregnated support is dried at a temperature in the range of about 105° C. to about 300° C.

7. A catalyst comprising a siliceous support and a catalytic agent selected from the class of compounds consisting of oxygen containing phosphoric acids and transitional element metal salts of phosphoric acids prepared by precalcining the siliceous support to a temperature between about 800° C. and about 1400° C. for a time sufficient to impart physical strength thereto independent of the phosphoric acid in the final catalyst, impregnating said calcined support with said catalytic agent, and drying the impregnated support at a temperature not greater than about 300° C.

8. A catalyst according to claim 7 in which the pre-calcined support is first impregnated with an aqueous solution of orthophosphoric acid, dried, and then impregnated with an aqueous solution of a salt of a transitional metal.

9. A catalyst according to claim 7 which is particularly suitable for polymerization, in which the pre-calcined and impregnated support is dried at a temperature between about 240° C. and 300° C.

10. A catalyst according to claim 7 which is particularly suitable for hydration, in which the pre-calcined and impregnated support is dried at a temperature between about 105° C. and 240° C.

11. A hydration catalyst comprising a siliceous support and a catalytic agent comprising a transitional element metal phosphate and phosphoric acid, said catalyst having been prepared by pre-calcining the siliceous support to a temperature between about 800° C. and about 1400° C. for a time sufficient to impart physical strength thereto independent of the phosphoric acid in the final catalyst, impregnating said calcined support with said catalytic agent, and drying the impregnated support at a temperature not greater than about 300° C. so as to obtain a catalyst containing between about 1% and about 20% of metal phosphate and between about 5% and about 60% of phosphoric acid.

12. A catalyst according to claim 11 in which the metal is zinc.

13. A catalyst according to claim 11 in which the metal is cadmium.

14. A catalyst according to claim 11 in which the metal is silver.

15. A catalyst according to claim 11 in which the metal is mercury.

16. A catalyst according to claim 11 in which the metal is nickel.

ROLAND F. DEERING.

REFERENCES CITED

The following references are of record in the file of this patent:

UNITED STATES PATENTS

| Number | Name | Date |
|---|---|---|
| 2,300,123 | Kuenecke | Oct. 27, 1942 |